US006719827B2

(12) United States Patent
Golden et al.

(10) Patent No.: US 6,719,827 B2
(45) Date of Patent: Apr. 13, 2004

(54) PROCESS FOR NITROUS OXIDE REMOVAL

(75) Inventors: Timothy Christopher Golden, Allentown, PA (US); Fred William Taylor, Coplay, PA (US); Elizabeth Helen Salter, Stoke-on-Trent (GB); Mohammad Ali Kalbassi, Walton-on-Thames (GB); Christopher James Raiswell, Crewe (GB)

(73) Assignee: Air Products and Chemicals, Inc., Allentown, PA (US)

( * ) Notice: Subject to any disclaimer, the term of this patent is extended or adjusted under 35 U.S.C. 154(b) by 16 days.

(21) Appl. No.: 10/087,356

(22) Filed: Mar. 1, 2002

(65) Prior Publication Data

US 2003/0164092 A1 Sep. 4, 2003

(51) Int. Cl.[7] ............................ B01D 53/04; B01D 53/26
(52) U.S. Cl. ............................ 95/120; 95/123; 95/129; 95/139; 96/130; 96/132; 96/143
(58) Field of Search .................. 95/117–120, 123, 95/129, 130, 139; 96/108, 130–132

(56) References Cited

U.S. PATENT DOCUMENTS

| 4,144,038 | A | * | 3/1979 | Armond | 95/95 |
|---|---|---|---|---|---|
| 4,541,851 | A | | 9/1985 | Bosquain et al. | 55/208 |
| 4,859,217 | A | * | 8/1989 | Chao | 95/130 |
| 4,933,158 | A | | 6/1990 | Aritsuka et al. | 423/210 |
| 5,137,548 | A | | 8/1992 | Grenier et al. | 55/23 |
| 5,232,474 | A | | 8/1993 | Jain | 55/26 |
| 5,451,248 | A | * | 9/1995 | Sadkowski et al. | 95/99 |
| 5,672,195 | A | * | 9/1997 | Moreau et al. | 95/96 |
| 5,674,311 | A | * | 10/1997 | Notaro et al. | 95/96 |
| 5,779,767 | A | * | 7/1998 | Golden et al. | 95/96 |
| 5,914,455 | A | * | 6/1999 | Jain et al. | 95/96 |
| 5,919,286 | A | | 7/1999 | Golden et al. | 95/98 |
| 6,080,226 | A | * | 6/2000 | Dolan et al. | 95/100 |
| 6,106,593 | A | | 8/2000 | Golden et al. | 95/120 |
| 6,273,939 | B1 | | 8/2001 | Millet et al. | 95/106 |
| 6,302,943 | B1 | * | 10/2001 | Johnson et al. | 95/96 |
| 6,328,786 | B1 | * | 12/2001 | Labasque et al. | 95/96 |
| 6,379,430 | B1 | * | 4/2002 | Monereau | 95/96 |
| 6,391,092 | B1 | * | 5/2002 | Shen et al. | 95/120 |
| 6,409,800 | B1 | * | 6/2002 | Ojo et al. | 95/96 |
| 6,416,569 | B1 | * | 7/2002 | Bulow et al. | 95/129 |
| 6,425,937 | B1 | * | 7/2002 | Kraus et al. | 95/90 |
| 6,432,171 | B1 | * | 8/2002 | Kumar et al. | 95/120 |
| 2002/0178914 | A1 | * | 12/2002 | Golden et al. | 95/129 |

FOREIGN PATENT DOCUMENTS

| EP | 0992274 | 4/2000 | |
|---|---|---|---|
| EP | 1064978 | 1/2001 | B01D/53/04 |
| EP | 1070538 | 1/2001 | |
| EP | 1092465 | 4/2001 | B01D/53/04 |
| EP | 1101521 | 5/2001 | |
| WO | WO 99/43416 | * 9/1999 | |

OTHER PUBLICATIONS

U. Wenning, "Nitrous Oxide in Air Separation Plants", *Proceedings from MUST 96*, pp. 79–89.

Ruthven, D. M., "Principles of Adsorption and Adsorption Processes", 1984, Chapter 6, John Wiley & Sons, pp. 166–205.

* cited by examiner

Primary Examiner—Robert H. Spitzer

(57) ABSTRACT

The present invention relates to a process and apparatus for the removal of nitrous oxide from a feed gas stream using an adsorbent having a nitrogen diffusion parameter of 0.12 sec$^{-1}$ or higher and a nitrous oxide capacity of 79 mmol/g/atm or higher at 30° C.

17 Claims, 2 Drawing Sheets

PROCESS FOR NITROUS OXIDE REMOVAL

BACKGROUND OF THE INVENTION

The present invention relates to a process and an apparatus for the removal of nitrous oxide from a feed gas stream.

The cryogenic purification of air requires a pre-purification step for the removal of high-boiling and hazardous materials. Principal high-boiling air components include water and carbon dioxide. If removal of these impurities from ambient air is not achieved, then water and carbon dioxide will freeze out in cold sections of the separation apparatus (for example in heat exchangers and liquid oxygen sump) causing pressure drop and flow and operational problems. Various hazardous materials including acetylene and other hydrocarbons also need to be removed. High-boiling hydrocarbons are a problem because they concentrate in the liquid oxygen section of the separation apparatus, resulting in a potential explosive hazard.

A minor air component that has recently been recognised as important in the pre-purification of air is nitrous oxide. Nitrous oxide is present in ambient air at concentrations of about 0.3 ppm. Nitrous oxide has similar properties to carbon dioxide and therefore presents potential operation problems resulting from solids formation in the separation apparatus column and heat exchangers. In addition, nitrous oxide presents a safety hazard as it is known to enhance combustion of organic materials, and it is shock sensitive. Therefore, there is significant industrial interest in the removal of trace nitrous oxide from ambient air prior to cryogenic distillation.

The nitrous oxide concentration in the atmosphere is steadily increasing at about 0.2 to 0.3% a year as a result of exhaust-gases of sewage treatment plants and catalysts of combustion engines and thermal plants. In addition, attention to nitrous oxide has increased as the required purity of gaseous products (for example rare gases and oxygen) has increased. Many previous solids formation problems noted in air separation apparatus and attributed to carbon dioxide may have been due to nitrous oxide.

Current technology for the pre-purification of air consists of adsorptive treatment including thermal swing (TSA) adsorption processes (disclosed for example in U.S. Pat. No. 4,541,851 and U.S. Pat. No. 5,137,548) and pressure swing adsorption (PSA) processes (disclosed for example in U.S. Pat. No. 5,232,474). In general such systems are designed for total water and carbon dioxide removal. A recent publication (Wenning, MUST meeting, 1996) highlighted the problem of nitrous oxide in air separation plants.

Wenning teaches that in conventional TSA processes using zeolites such as 5A, nitrous oxide is less strongly adsorbed than carbon dioxide. This leads to breakthrough of nitrous oxide before carbon dioxide. Nitrous oxide then enters the cold section of the apparatus. Similar results occur in alumina-based PSA processes. The applicants have shown that an all-alumina PSA process removes about 30% of the inlet nitrous oxide concentration in air. Mixed beds of alumina and zeolite used in TSA or PSA processes are known to result in more nitrous oxide breakthrough than non-mixed beds.

Catalysts are available which convert nitrous oxide to nitrogen and oxygen (Wenning), but these catalysts function at elevated temperatures which is undesirable.

U.S. Pat. No. 5,919,286 teaches using a layer of zeolite at the product end of a PSA bed for nitrous oxide removal. U.S. Pat. No. 6,106,593 teaches a 3 layer TSA adsorbent bed where the final adsorbent layer removes nitrous oxide. The adsorbent is defined by a minimum adsorption capacity for nitrous oxide, and includes adsorbents such as CaX.

US 6,273,939 teaches the use of faujasite type zeolites, especially calcium-exchanged X or LSX, for the removal of nitrous oxide from air prior to cryogenic distillation. The adsorbent is defined by size only.

EP-A-1064978 teaches the use of barium-exchanged zeolite for removal of carbon dioxide, nitrous oxide and organic impurities from air prior to cryogenic distillation. 13X zeolite is used, which is stated to show a large amount of nitrous oxide breakthrough before carbon dioxide breakthrough.

EP-A-1092465 teaches the use of X-type zeolites with specified silicon to aluminum ratios for adsorptive removal of nitrous oxide and hydrocarbons from air prior to cryogenic distillation. Siliporite G586 from Ceca in 1.6×2.5 mm beads is used.

In these documents, adsorbents useful for nitrous oxide removal from air are identified by their composition or equilibrium selectivity.

BRIEF SUMMARY OF THE INVENTION

In a first aspect, the present invention provides a process for removing water, carbon dioxide and nitrous oxide from a feed gas stream, comprising passing the feed gas stream through a first adsorbent to adsorb water, a second adsorbent to adsorb carbon dioxide and a third adsorbent to adsorb nitrous oxide and to form a purified feed gas stream, wherein the third adsorbent has a nitrogen diffusion parameter of $0.12 \text{ sec}^{-1}$ or higher and a nitrous oxide capacity of 79 mmol/g/atm or higher at 30° C. and the first, second and third adsorbents may optionally be the same material.

Preferably, the third adsorbent has a nitrogen diffusion parameter of $0.15 \text{ sec}^{-1}$ or higher.

Optionally, the second and third adsorbents are the same material and are different from the first adsorbent.

Preferably, the feed gas is air.

Preferably, the process further comprises cryogenic distillation of the purified feed gas stream to separate a nitrogen rich stream and/or an oxygen rich stream.

Preferably, the adsorbents are regenerated by thermal swing adsorption. The adsorbents are preferably regenerated at a temperature of 50 to 400° C. and/or at a pressure of 0.1 to 20 atm. Preferably, oxygen, nitrogen, methane, hydrogen, argon or a mixture of two or more thereof is passed over the adsorbents as they are regenerated.

Preferably, the feed gas stream is at a temperature of 0 to 50° C., and/or at a pressure of 3 to 20 atm.

The first adsorbent may be selected from alumina, silica gel, impregnated alumina, zeolite A and zeolite X, and the second adsorbent may be selected from impregnated alumina, impregnated composite alumina/zeolite, zeolite A and zeolite X.

In a second aspect, the present invention relates to apparatus for removing water, carbon dioxide and nitrous oxide from a feed gas stream comprising in fluid series connection a first adsorbent to adsorb water, a second adsorbent to remove carbon dioxide and a third adsorbent to remove nitrous oxide, wherein the third adsorbent has a nitrogen diffusion parameter of $0.12 \text{ sec}^{-1}$ or higher and a nitrous oxide capacity of 79 mmol/g/atm or higher at 30° C. and the first, second and third adsorberts are optionally the same material.

The apparatus preferably further comprises in fluid series connection a cryogenic air separation unit.

In a third aspect, the present invention relates to a process for removing nitrous oxide from a feed gas stream, comprising passing the feed gas stream over an adsorbent having a nitrogen diffusion parameter of 0.12 sec$^{-1}$ or higher and a nitrous oxide capacity of 79 mmol/g/atm or higher at 30° C.

DETAILED DESCRIPTION OF THE INVENTION

EXAMPLES

Example 1

Figure 1:
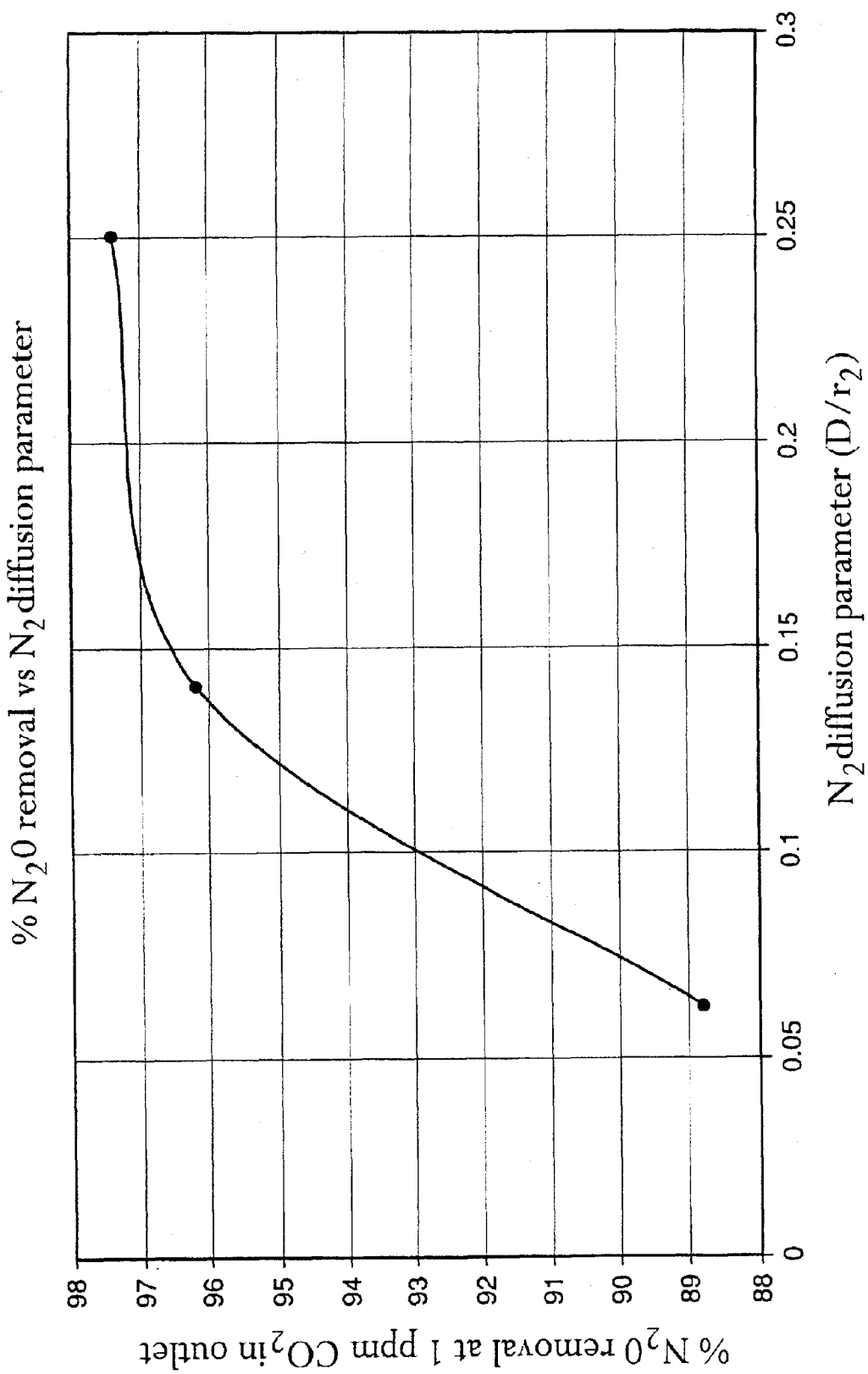
FIG. 1 shows a plot of nitrogen diffusion parameter vs. % nitrous oxide removal of 1 ppm carbon dioxide in the TSA outlet.

Carbon dioxide breakthrough curves were measured on samples of NaX and CaX at 25° C., 100 psig with a feed gas of air with 400 ppm carbon dioxide. The feed cross sectional flow rate was 30 lbmoles/hr/ft$^2$ (146 kg moles/hr/m$^2$). The data were obtained in a 1 inch (2.54 cm)diameter column by 6 feet (1.83 m) long. Prior to the experiments, the zeolites were regenerated in flowing nitrogen at 200° C. The carbon dioxide capacity and mass transfer zone results are presented in the table below.

| Adsorbent | Relative carbon dioxide capacity | Relative carbon dioxide mass transfer zone |
|---|---|---|
| NaX | 1.00 | 1.0 |
| CaX | 1.29 | 1.8 |

The data in the table show a surprising result. Exchange of calcium for sodium in the X zeolite increases the carbon dioxide capacity as might be expected. However, the surprising result is that calcium exchange leads to a significant increase in the carbon dioxide mass transfer zone. In general, as the capacity of an adsorbent increases, the mass transfer zone for impurity removal decreases. This is because the higher driving force of the improved capacity shortens the mass transfer zone. The table results are surprising since the higher capacity CaX also shows a longer mass transfer zone despite an improved driving force.

If CaX is to be used to adsorb nitrous oxide and carbon dioxide, the relatively long mass transfer zone for carbon dioxide makes it important to use a form of the adsorbent which has a high capacity and short mass transfer zone for nitrous oxide, to prevent early breakthrough of the gases.

Example 2

Carbon dioxide and nitrous oxide breakthrough curves were measured on CaX materials with different gas uptake rates at 25° C., 100 psig (690 kPag) with a feed gas or air containing 400 ppm carbon dioxide and 5 ppm nitrous oxide. The feed G-rate was 30 lbmoles/hr/ft$^2$ (146 kg moles/hr/m$^2$). The data were obtained in a 1 inch (2.54 cm)diameter column by 6 feet (1.83 m) long. Prior to the experiments, the zeolites were regenerated in flowing nitrogen at 200° C.

All CaX materials tested had similar equilibrium nitrous oxide capacities, but their mass transfer rates were modified by changing particle size and particle form. The nitrogen uptake rate of each sample was determined by performing a volumetric uptake test and fitting the uptake rate curve (fractional approach to equilibrium vs. time) to Fick's Law. This technique is described in "Principles of Adsorption and Adsorption Processes", 1984, Chapter 6, D. Ruthven, John Wiley & Sons.

The results of the breakthrough testing are given in the following table.

| Adsorbent | Form and Size | Relative carbon dioxide capacity | Absolute nitrous oxide capacity (mmol/g/atm) | Relative nitrous oxide capacity | % nitrous oxide removal at 1 ppm carbon dioxide out | D/r$^2$ (sec$^{-1}$) |
|---|---|---|---|---|---|---|
| CaX 1 | 1/16 inch pellets | 1.0 | 237 | 1.0 | 97.4% | 0.25 |
| CaX 2 Ceca Grade G586 | 8 × 12 mesh beads | 1.06 | 251 | 1.03 | 96.2% | 0.14 |
| CaX 3 | 6 × 8 mesh beads | 1.10 | 261 | 1.05 | 88.8% | 0.062 |
| CaX 4 UOP Grade VSA 2 | 8 × 12 mesh beads | 0.94 | 223 | 0.93 | 93.5% | 0.11 |

The results show that, although all four CaX samples have essentially the same quilibrium properties, CaX materials with higher mass transfer rates show improved itrous oxide capability.

The nitrogen diffusion parameters of adsorbents used in the known processes discussed above were also determined. The D/r$^2$ value for UOP APGB 8×12 (EP-064978) was 0.19 sec$^{-1}$. The D/r$^2$ value for 1/16 inch UOP 13X (U.S. Pat. No. 5919286) was 1.1 sec$^{-1}$. However, these similar materials do not have the desired equilibrium nitrous oxide adsorption properties: the nitrous oxide adsorption capacity of UOP 13X is 71 mmol/g/atm. The D/r$^2$ value for Siliporite G586 from Ceca in 1.6×2.5 mm beads (EP-1092465) ranged from 0.10 to 0.14 sec$^{-1}$.

The adsorbents disclosed in U.S. Pat. No. 6,273,939, U.S. Pat. No. 4,933,158 and U.S. Pat. No. 6,106,593 are defined by material and size only. As is shown by comparing the results for CaX2 and CaX4 in the table above, adsorbents of the same material and size may have different nitrogen diffusion parameters, and therefore the adsorbents used in these processes are not sufficiently well-defined to determine their nitrogen diffusion parameters. It is expected that CaX4 has a smaller macropore diameter than CaX2.

FIG. 1 shows a plot of nitrogen diffusion parameter vs. % nitrous oxide removal at 1 ppm carbon dioxide in the TSA outlet. The results show that once $D/r^2$ values of 0.15 sec$^{-1}$ or higher are obtained, CaX of suitable capacity can remove essentially all nitrous oxide in the feed air.

Example 3

Figure 2:
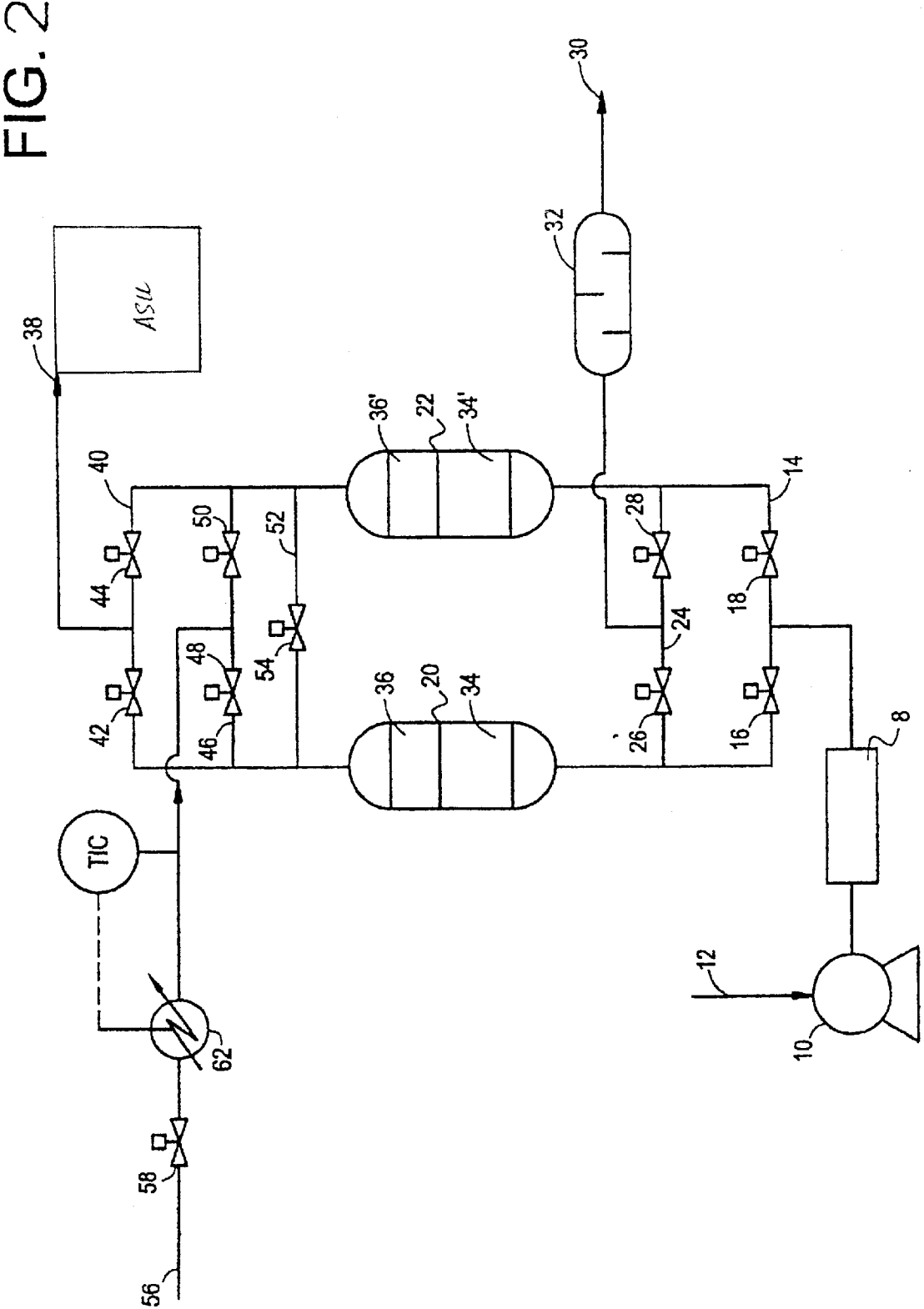
FIG. 2 shows a schematic view of apparatus used in a preferred embodiment of the present invention.

As shown in FIG. 2, air to be purified is supplied to a main air compressor system 10 at an inlet 12 in which it is compressed by a multi-stage compressor with inter and after cooling by heat exchange with water. Optionally, the compressed air feed Is sub-cooled In a cooler 8. The cooled compressed air is supplied to an inlet manifold 14 containing inlet control valves 16 and 18 to which is connected a pair of adsorbent bed containing vessels 20 and 22. The inlet manifold is bridged downstream of the control valves 16 and 18 by a venting manifold 24 containing venting valves 26, 28 which serve to close and open connections between the upstream end of respective adsorbent vessels 20 and 22 and a vent 30 via a silencer 32. Each of the two adsorbent beds 20 and 22 contains two adsorbents. A lower portion of the adsorbent bed is designated by the numerals 34, 34' in respective beds and upper portion by the numeral 36, 36'. Portion 34, 34' contains a first adsorbent to adsorb water (for example alumina) and portion 36, 36' contains a second adsorbent to adsorb carbon dioxide and nitrous oxide (for example CaX2, Example 2).

In alternative embodiments, each adsorbent bed 20, 22 may contain a single adsorbent, or may contain three separate adsorbents. Adsorbents may be arranged in layers, for example adsorbents may be radially layered. It should be understood that the vessels 20 and 22 can each if desired be separated into smaller vessels arranged in series and references to "layers" of adsorbent above include arrangements in which the separate adsorbents are placed in separate vessels arranged in series.

The apparatus has an outlet 38 connected to the downstream ends of the two adsorbent vessels 20, 22 by an outlet manifold 40 containing outlet control valves 42, 44. The outlet is connected to an air separation unit (ASU). The outlet manifold 40 is bridged by a regenerating gas manifold 46 containing regenerating gas control valves 48 and 50. Upstream from the regenerating gas manifold 46, a line 52 containing a control valve 54 also bridges across the outlet manifold 40.

An outlet for regenerating gas is provided at 56 which through control valve 58 is connected to pass through a heater 62 to the regenerating gas manifold 46. The operation of the valves may be controlled by suitable programmable timing and valve opening means as known in the art, not illustrated.

In operation air is compressed in the main compressor system 10 and is fed to the inlet manifold 14 and passes through one of the two vessels containing adsorbent. Starting from a position in which air is passing through open valve 16 to adsorbent vessel 20, and through open valve 42 to the outlet 38 and air separation unit, valve 18 in the inlet manifold will just have been closed to cut-off vessel 22 from the feed of air for purification. Valve 44 will just have closed also. At this stage valves 46, 50, 54, 26 and 28 are all closed. Bed 20 is thus on-line and bed 22 is to be regenerated.

To commence depressurisation of bed 22, valve 28 is opened and once the pressure in the vessel 22 has fallen to a desired level, valve 28 is kept open whilst valve 50 is opened to commence a flow of regenerating gas. The regenerating gas will typically be a flow of dry, $CO_2$-free nitrogen obtained from the air separation unit cold box, possibly containing small amounts of argon, oxygen and other gases, to which the air purified in the apparatus shown is passed. Valve 58 is opened so that the regenerating gas is heated to a temperature of for instance 100° C. before passing into the vessel 22. The exit purge gas emerges from the vent outlet 30 in a cooled state.

At the end of the allotted regeneration period, valve 58 may be closed to end the flow of regenerating gas and valve 54 may be opened to displace nitrogen from the adsorbent and, after the closing of valve 28, to repressurise the vessel 22 with purified air. Thereafter, valve 54 may be closed and valves 18 and 44 may be opened to put the vessel 22 back on line. The vessel 20 may then be regenerated in a similar manner and the whole sequence continued with the vessels being on-line, depressurising, regenerating, repressurising, and going back on-line in phase cycles of operation.

It will be appreciated that although the invention has been described with reference to preferred embodiments, many variations and modifications thereof are possible within the scope of the invention.

What is claimed is:

1. A process for removing water, carbon dioxide and nitrous oxide from a feed gas stream, comprising passing the feed gas stream through a first adsorbent to adsorb water, a second adsorbent to adsorb carbon dioxide and a third adsorbent to adsorb nitrous oxide and to form a purified feed gas stream, wherein the third adsorbent has a nitrogen diffusion parameter of 0.12 sec$^{-1}$ or higher and a nitrous oxide capacity of 79 mmol/g/atm or higher at 30° C. and the first, second and third adsorbents may optionally be the same material.

2. A process as claimed in claim 1, wherein the third adsorbent has a nitrogen diffusion parameter of 0.15 sec$^{-1}$ or higher.

3. A process as claimed in claim 1, wherein the second and third adsorbents are the same material, and are different from the first adsorbent.

4. A process as claimed in claim 1, wherein the feed gas is air.

5. A process as claimed in claim 4, further comprising cryogenic distillation of the purified feed gas stream to separate a nitrogen rich stream and/or an oxygen rich stream.

6. A process as claimed in claim 1, wherein the adsorbents are regenerated by thermal swing adsorption.

7. A process as claimed in claim 6, wherein the adsorbents are regenerated at a temperature of 50 to 400° C.

8. A process as claimed in claim 6, wherein the adsorbents are regenerated at a pressure of 0.1 to 20 atm.

9. A process as claimed in claim 6, wherein oxygen, nitrogen, methane, hydrogen, argon or a mixture of two or more thereof is passed over the adsorbents as they are regenerated.

10. A process as claimed in claim 1, wherein the feed gas stream is at a temperature of 0 to 50° C.

11. A process as claimed in claim 1, wherein the feed gas stream is at a pressure of 3 to 20 atm.

12. A process as claimed in claim 1, wherein the first adsorbent is selected from alumina, silica gel, impregnated alumina, zeolite A and zeolite X.

13. A process as claimed in claim 1, wherein the second adsorbent is selected from impregnated alumina, impregnated composite alumina/zeolite, zeolite A and zeolite 20 X.

14. A process as claimed in claim 1, wherein the second and third adsorbents are the same material, and this material is calcium exchanged X zeolite.

15. A process for removing nitrous oxide from a feed gas stream, comprising passing the feed gas stream over an adsorbent having a nitrogen diffusion parameter of 0.12 $\sec^{-1}$ or higher and a nitrous oxide capacity of 79 mmol/g/atm or higher at 30° C.

16. Apparatus for removing water, carbon dioxide and nitrous oxide from a feed gas stream comprising in fluid series connection a first adsorbent to adsorb water, a second adsorbent to remove carbon dioxide and a third adsorbent to remove nitrous oxide, wherein the third adsorbent has a nitrogen diffusion parameter of 0.12 $\sec^{-1}$ or higher and a nitrous oxide capacity of 79 mmol/g/atm or higher at 30° C. and the first, second and third adsorbents may optionally be the same material.

17. Apparatus as claimed in claim 16, further comprising in fluid series connection a cryogenic air separation unit.

* * * * *

UNITED STATES PATENT AND TRADEMARK OFFICE
CERTIFICATE OF CORRECTION

PATENT NO.      : 6,719,827 B2
DATED           : April 13, 2004
INVENTOR(S)     : Golden et al.

It is certified that error appears in the above-identified patent and that said Letters Patent is hereby corrected as shown below:

<u>Title page,</u>
Item [74], *Attorney, Agent or Firm,* name was omitted and should be added:
-- Attorney Willard Jones, II --

<u>Column 6,</u>
Line 62, delete the number "20" should read -- zeolite X. --

Signed and Sealed this

Eighth Day of June, 2004

JON W. DUDAS
*Acting Director of the United States Patent and Trademark Office*